United States Patent
Anamandra et al.

(10) Patent No.: US 12,159,174 B2
(45) Date of Patent: Dec. 3, 2024

(54) MESSAGE QUERY SERVICE AND MESSAGE GENERATION FOR A SOCIAL NETWORK

(71) Applicant: SAP SE, Walldorf (DE)

(72) Inventors: Sai Hareesh Anamandra, Bengaluru (IN); Gopi Kishan, Bangalore (IN); Kavitha Krishnan, Bangalore (IN); Rohit Jalagadugula, Visakhapatnam (IN); Akash Srivastava, Lucknow (IN)

(73) Assignee: SAP SE, Walldorf (DE)

( * ) Notice: Subject to any disclaimer, the term of this patent is extended or adjusted under 35 U.S.C. 154(b) by 78 days.

(21) Appl. No.: 17/948,652

(22) Filed: Sep. 20, 2022

(65) Prior Publication Data

US 2024/0095105 A1    Mar. 21, 2024

(51) Int. Cl.
*G06F 9/54* (2006.01)
*G06N 5/01* (2023.01)

(52) U.S. Cl.
CPC .............. *G06F 9/546* (2013.01); *G06N 5/01* (2023.01)

(58) Field of Classification Search
None
See application file for complete search history.

(56) References Cited

U.S. PATENT DOCUMENTS

| | | | |
|---|---|---|---|
| 11,157,464 B1 | 10/2021 | Agrawal et al. | |
| 2012/0095987 A1* | 4/2012 | Cheng | G06F 16/24535 |
| | | | 707/E17.001 |
| 2014/0229474 A1* | 8/2014 | Or | G06F 16/3326 |
| | | | 707/728 |
| 2016/0373456 A1* | 12/2016 | Vermeulen | G06F 16/3322 |
| 2017/0097961 A1* | 4/2017 | Li | G06F 16/24575 |
| 2020/0034357 A1* | 1/2020 | Panuganty | G06F 16/24578 |
| 2020/0134019 A1* | 4/2020 | Podgorny | G06N 3/044 |
| 2021/0149901 A1* | 5/2021 | Fonseca de Lima | G06F 16/24522 |
| 2021/0311939 A1* | 10/2021 | Shtilkind | G06F 16/168 |
| 2021/0403357 A1* | 12/2021 | Milburn | B01D 61/04 |
| 2022/0129451 A1* | 4/2022 | Haprian | G06F 16/252 |

FOREIGN PATENT DOCUMENTS

WO    WO 2013/008978 A1 *    1/2013    ........... G06F 16/955

* cited by examiner

*Primary Examiner* — Charles E Anya
(74) *Attorney, Agent, or Firm* — Klarquist Sparkman, LLP

(57) ABSTRACT

A method includes receiving a message query from an entity identifier participating in a social network. The message query specifies one or more entities, one or more requirements, and one or more constraints. A set of message query parameters is generated based on the message query. A set of queries for a semantic graph of the social network is generated based on the set of message query parameters. The set of queries is applied to the semantic graph to obtain a set of query results. A message context of the entity identifier is determined based on the set of query results and the set of message query parameters. A set of messages from a message repository is determined based on the message context. The set of messages can be presented on a client computer associated with the entity identifier.

20 Claims, 6 Drawing Sheets

MESSAGE QUERY SERVICE AND MESSAGE GENERATION FOR A SOCIAL NETWORK

FIELD

The field generally relates to messaging platforms, such as announcement platforms.

BACKGROUND

A social network of machines (also known as machine social network) is a network of machines that can interact with each other. For example, the machines can have machine profiles and can communicate with each other, make recommendations to each other, and operate autonomously. The ecosystem of the social network of machines can include various other entities that can communicate with one or more of the machines in the social network of machines. In this ecosystem, there is a need for a requirements announcement service that allows machines and entities to create messages with specific requirements and display the messages to specific targets. An example of a message with a specific requirement can be to find an equipment manufacturer at a certain location that can provide a certain part within a certain time period.

DETAILED DESCRIPTION

Example I—Overview

Figure 1:
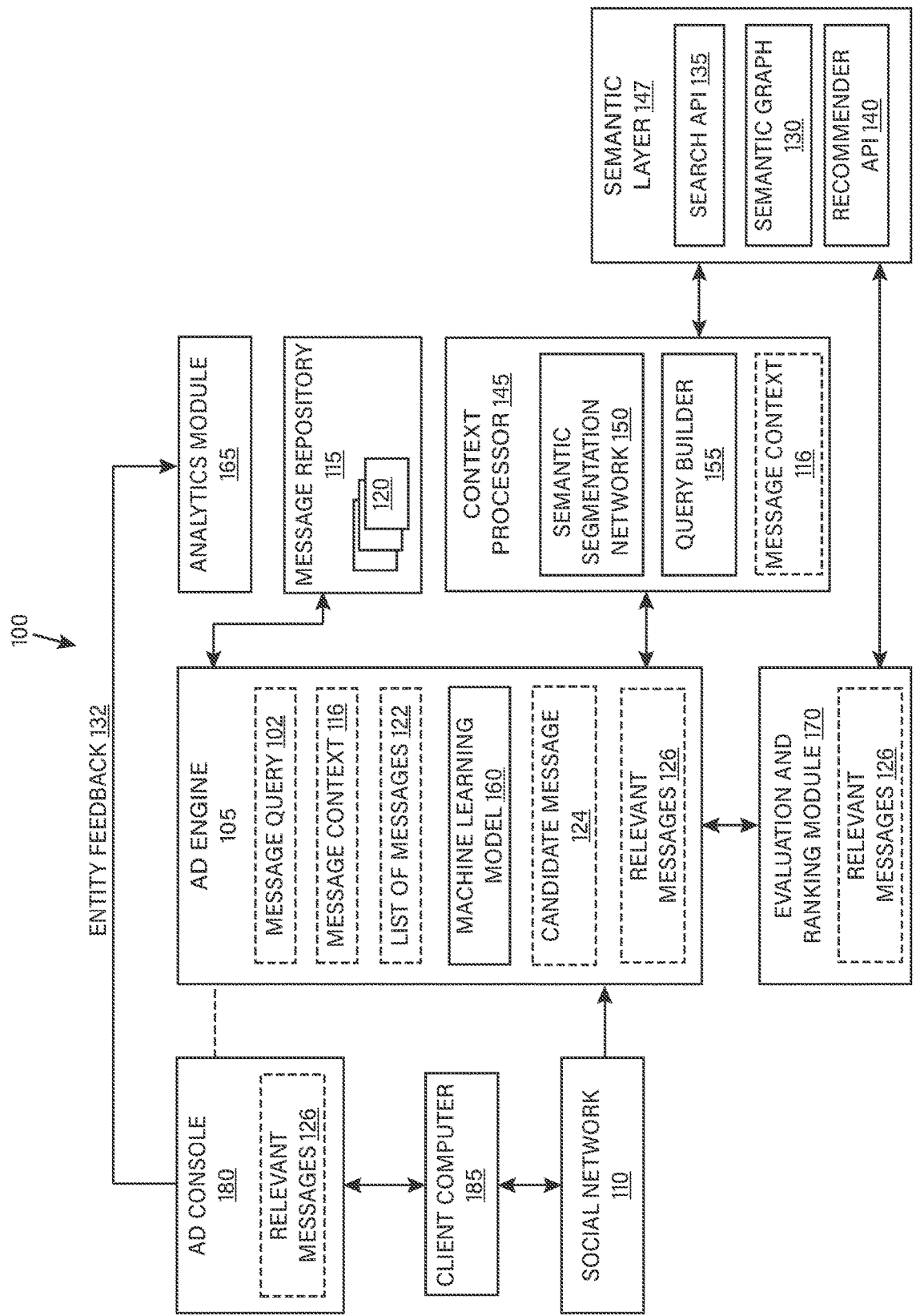
FIG. 1 is a block diagram of an example system implementing message query service.

Described herein are technologies providing message querying service and message generation service for a social network, such as a social network of machines. The technologies provide a system that can receive a message query from an entity in the social network, determine a message context of the entity using a semantic graph of the social network, and search for relevant messages to present to the entity based on the message context of the entity. Since the search for the relevant messages takes into account the message context of the entity, the search is efficient, and the relevant messages are effective.

Example IIA—Message

A message contains information that an entity (see Example IIB) in a social network (e.g., a social network of machines) wants to communicate to a target audience. The message can convey various types of information, such as information to promote a product, promote a service, announce an event, or announce a community. A message can have a goal (e.g., brand awareness, lead generation, drive traffic, advertise products or services to target businesses, or solve a problem).

A message can have one or more performance parameters that can be measured while the message is rendered in a network. Examples of performance parameters that can be measured can include impressions (e.g., the number of times the message is shown to users), clicks (e.g., the number of times users click on the message), click through rate (e.g., the clicks divided by the impressions), pay per click (e.g., the fee paid each time a user clicks on the message), number of unique users (e.g., the number of different users who saw the message), conversions (e.g., the number of users who clicked on the message and took an action), bounce rate (e.g., the number of users who clicked on the message and did not take an action), and user base (e.g., the participating entities in the social network).

Example IIB—Entity

A social network of machines is a generalization of machine to machine (M2M) connectivity framework and Internet of Things (IoT) framework. Entities in the social network are represented by profiles, and connections can be formed between the profiles. A semantic graph of the social network can be built that includes the entities as nodes and relationships between the entities as edges connecting the nodes. In a social network of machines, entities can be equipment manufacturer (suppliers), company/plant/factory (customers), equipment/machines, financial institutions, service organizations, resellers, etc.

Example IIC—Machine

A machine is a device that has a decision-making functionality (e.g., can scan the status of sensors, make periodic health checks, perform troubleshooting if needed, etc.) and some predictive analytics capabilities (e.g., can determine or predict sensors or parts that need attention, replacement, or service). The machine has the capability of networking with similar type of configuration machines. The machine can have the capability to mine through past history of services and replacements, including any feedback and status details on the services and replacements.

A machine participating as an entity in a social network of machines has a machine profile, which can have a public part and a private part. The machine profile can include an identifier of the machine and metadata of the machine. Examples of information that can be stored in the metadata can include manufacturing details of the machine, configuration details and health of sensors associated with the machine, and service/replacement history of sensors/parts associated with the machine.

Example III—Example System Implementing Message Query Service

FIG. 1 is a block diagram of an example system 100 implementing a message query service. The system 100 can receive a message query from an entity participating in a social network (e.g., a social network of machines as described in Example IIB) and present relevant messages to the entity.

In the illustrated example, an entity participating in a social network 110 (e.g., an entity at a client computer 185 or a machine with a machine profile) can generate or trigger generation of a message query 102. For example, the message query 102 can be generated by a search service, a recommender service, a predictive maintenance, or user query (the user can be a human or a machine). The message query 102 can be in the form of a text query. For illustration purposes, an example message query M can be "I am a business user running a manufacturing unit of Cola, I am looking for an AMC for Asset X of Model Y. I am based out of Pune and I need it in the next 1 month" ("AMC" stands for annual maintenance contract).

The system 100 includes an ad engine 105 that can receive the message query 102 and determine a set of relevant messages for the message query 102 from message 120 stored in a message repository 115. In some examples, the messages 120 stored in the message repository 115 are created by entities (e.g., people or machines) in the social network 110. The messages 120 can be created, for example, using the system described in Example V. A message 120 is a container that can hold an ad message and other data related to the ad message. In one example, a message 120 can have the following attributes: message identifier, ad message, relevance score, target metrics, performance statistics, and ad settings. The ad message can contain various types of message data, such as mode of display, keywords, content, and search context. The ad settings can contain various types of data related to rendering the ad (e.g., expiry time, goal, and budget).

The system 100 includes a context processor 145 that can generate a message context of the entity for the message query 102. The context processor 145 interacts with a semantic layer 147 to generate the message context. The semantic layer 147 includes a semantic graph 130 (which can also be referred to as a knowledge graph) of the social network 110. The semantic graph 130 is a semantic network representing relationships between the entities in the social network 110, how the entities are related to each other, and what the entities communicate to each other. The semantic layer 147 can include a search API 135 and a recommender API 140 that can be used to extract information from the semantic graph 130. The semantic layer 147 can dynamically build subgraphs of the semantic graph 130. For example, a request to the search API 135 can include a set of entities, and the semantic layer 147 can build or extract a semantic subgraph associated with the set of entities from the semantic graph 130.

The context processor 145 can include a semantic segmentation network 150 that accepts the message query 102 and generates a set of message query parameters (e.g., entities parameter, requirements parameter, relationships parameter, and constraints parameter) based on the message query 102. In one example, the semantic segmentation network 150 can be configured or trained to generate tokens from the message query 102. Tokens can be composed of words, sentences, or topics and are generated based on semantic criteria. The semantic segmentation network 150 can extract features from the tokens and generate the message query parameters based on the extracted features. In some examples, the semantic segmentation network 150 can extract entities from the tokens and request a semantic subgraph associated with the entities from the semantic layer 147. From the semantic subgraph, the semantic segmentation network can determine relationships. The semantic segmentation network 150 can extract requirements from the tokens and determine a requirements parameter from the requirements. The semantic segmentation network 150 can extract constraint features (e.g., time, location, and resources) related to the entities from the tokens and generate constraints using the constraint features. For illustration purposes, for the example message query M, the semantic segmentation network 150 can output the following message query parameters: {Entities: Business user of Manufacturing, Asset X} and, {Requirements: AMC}, {Relationships: Asset X of Model Y, Business User in Cola}, and {Constraints: Location: Pune, Time: Within 1 Month}.

The context processor 145 can include a query builder 155 that generates a set of (one or more) queries for the semantic graph 130 based on the message query parameters outputted by the semantic segmentation network 150. The queries can be designed to determine the context of the entity from the purview of the message query 102 (e.g., determine the entities in the social network that can fulfill the requirements under the constraints). For illustration purposes, a set of example queries that the query builder can generate for the example message query M based on the example message query parameters outputted by the semantic segmentation network 150 can include: all the AMC contract suppliers within Pune; all the AMC contract suppliers whose turnaround time is less than a month; AMC contracts of other business users of Cola; and past history of AMC contracts of business user.

The ad engine 105 can communicate with the context processor 145. The ad engine 105 can send a request for a message context to the context processor 145. The request can include the message query 102. The context processor 145 can generate message query parameters (e.g., requirements parameter, entities parameter, relationships parameter, and constraints parameter) based on the message query 102 (e.g., using the semantic segmentation network 150), build queries for the semantic graph 130 (e.g., using the query builder 155) using the message query parameters, apply the queries to the semantic graph 130 (e.g., by calling the search API 135 and/or recommender API 140), and receive a set of (one or more) query results from the semantic graph 130. The context processor 145 can construct a message context 116 of the entity using information from the message query parameters (e.g., requirements parameter, entities parameter, relationships parameter, and constraints parameter) generated based on the message query 102 and information from the set of query results received from the semantic layer 147.

In one example, the message context 116 of the entity can include constraints extracted from the message query 102, a list of entities from the set of query results from the semantic layer 147, and metadata from the set of query results from the semantic layer 147. The list of entities in the message context 116 can include potential entities that can meet requirements extracted from the message query 102. The metadata in the message context 116 can include information about the relationships extracted from the message query 102 within the context of the requirements extracted from the message query 102. For illustrative purposes, for the example message query M, the message context 116 can include: {Constraints: Location: Pune, Time: Within 1 Month}, a list of AMC contracts (e.g., AMC contracts of other business users of Cola and past history AMC contracts of the business user in the set of relationships), and a list of AMC contract suppliers. The message context 116 can be in the form of a graph.

The ad engine 105 communicates with the message repository 115. The ad engine 105 can query the message repository 115 for messages, store messages in the message repository 115, and update messages in the message repository 115. In some examples, the ad engine 105 can receive the message context 116 from the context processor 145 and query the message repository 115 for a list of messages 122 that match the entities in the message context 116. The ad engine 105 can determine which messages in the list of messages 122 are candidate messages for the message query 102 based on relevance scores of the messages. In one example, the ad engine 105 can select messages having relevance scores exceeding a threshold as the candidate messages 124.

In one example, the ad engine 105 includes a machine learning model 160 that can compute a relevance score for messages. For example, the machine learning model 160 can receive a message m and the message context of the entity as inputs and produce a relevance score for the message m. In one example, the machine learning model 160 can be a transformer-based attention model (e.g., a deep learning model that adopts the mechanism of self-attention to understand language sequences). The ad engine 105 can use the machine learning model 160 to determine relevance scores for the messages on the list of messages. The relevance scores can be stored in the relevance score attribute of the messages.

In some examples, the ad engine 105 can incorporate historical performance of the messages in the selection of the candidate messages. In some examples, the performance statistics p associated with a message m can be time-series data produced from measurements of a set of (one or more) metrics while the message m is available for display within the network. The performance statistics p associated with a message m can be stored within the message over the timeline of the message. The ad engine 105 can determine whether a message in the list of messages 122 has a performance exceeding a threshold before selecting the message as a candidate message. In some cases, the ad engine 105 can adjust the relevance score of a message based on the performance data of the message. The adjustments to the relevance scores of the messages on the list of messages 122 can be performed prior to selecting the candidate messages 124 based on relevance scores.

The system 100 includes an analytics module 165 that can monitor a set of (one or more) metrics for messages and analyze the measurements to produce the performance statistics for the messages. In some cases, when a message is stored in the message repository 115, the message is also registered in the analytics module 165, allowing the analytics module 165 to monitor the performance of the message over the timeline of the message. The ad engine 105 can communicate with the analytics module 165 to obtain the performance statistics for messages and can store the performance statistics in the messages. In some examples, the ad engine 105 can poll the analytics module 165 for updates on the performance statistics of the messages prior to incorporating the performance context of the messages into selection of the candidate messages 124.

In some cases, the performance statistics obtained from the analytics module 165 can include entity feedback on the messages. In these cases, the entity feedback can be incorporated into the selection of the candidate messages 124. For example, if an entity feedback for a message is low, the relevance score computed for the message may be reduced by a factor. On the other hand, if the entity feedback for a message is high, the relevance score computed for the message may be increased by the factor. The candidate messages 124 can be selected from the list of messages 122 based on the adjusted relevance scores.

In some examples, the system 100 can include an evaluation and ranking module 170 that evaluates the candidate messages 124 for feasibility. The ad engine 105 can transmit the candidate message 124 to the evaluation and ranking module 170 and receive a set of relevant messages 126 from the evaluation and ranking module 170. In one example, the evaluation and ranking module 170 can rank (or sort) the candidate messages 124 by relevance score. The evaluation and ranking module 170 can evaluate the feasibility of the candidate messages 124, for example, using information from the semantic graph 130. For example, the evaluation and ranking module 170 can determine the availability, bandwidth, compliance, and actual cost associated with the candidate messages. In some examples, the evaluation and ranking module 170 can determine the entities in the candidate messages 124. The evaluation and ranking module can request a semantic subgraph that captures the entities and their corresponding relationships from the semantic layer 147. Past interactions of the entities can be stored with the entities in the semantic subgraph. Also stored with each of the supplier entities can be the current status of the supplier, bandwidth to supply, availability of resources, and cost of the resource. The evaluation and ranking module 170 can evaluate feasibility of the candidate message 124 using information extracted from the semantic subgraph. The evaluation and ranking module 170 can select one or more top ranking feasible candidate messages 124 to include in the set of relevant messages 126.

The system 100 can include an ad console 180 that allows an entity to view, create, and edit messages. In one example, the ad engine 105 can communicate with the ad console 180 and send the set of relevant messages 126 to the ad console 180 for rendering. In one example, the entity of the message query 102 can access the ad console 180 from a client computer 185 within the social network 110 with the appropriate access control. The message query 102 can include the identifier of the entity such that when the entity accesses the ad console 180, the set of relevant messages 126 produced from the message query 102 can be presented to the entity.

In some examples, presentation of the set of relevant messages 126 to the entity can include displaying or rendering the set of relevant messages 126 in a user interface. In some cases, only the ad messages in the set of relevant messages 126 may be displayed or rendered in the user interface. In other cases, additional data (for example, performance statistics) from the set of relevant messages 126 may be displayed or rendered alongside the ad messages.

In some examples, the entity can review the set of relevant messages 126 and give feedback on a relevant message. In some examples, the ad console 180 can transmit entity feedback 132 for a given message m to the analytics module 165. The analytics module 165 can include the entity feedback 132 in the performance statistics for the given message m. Subsequently, when the performance statistics for the given message m is transmitted to the ad engine 105, the ad engine 105 can use the entity feedback in the performance statistics to inform selection of candidate messages for a message query, in some examples.

The system 100 can be implemented in a computer system or a network of computer systems. The components of the system 100 can be stored in one or more computer-readable storage media or computer-readable storage devices and executed by one or more processor units. The technologies described herein can be generic to the specifics of operating systems or hardware and can be applied in any variety of environments to take advantage of the described features.

Example IV—Example Method Implementing Message Query Service

Figure 2:
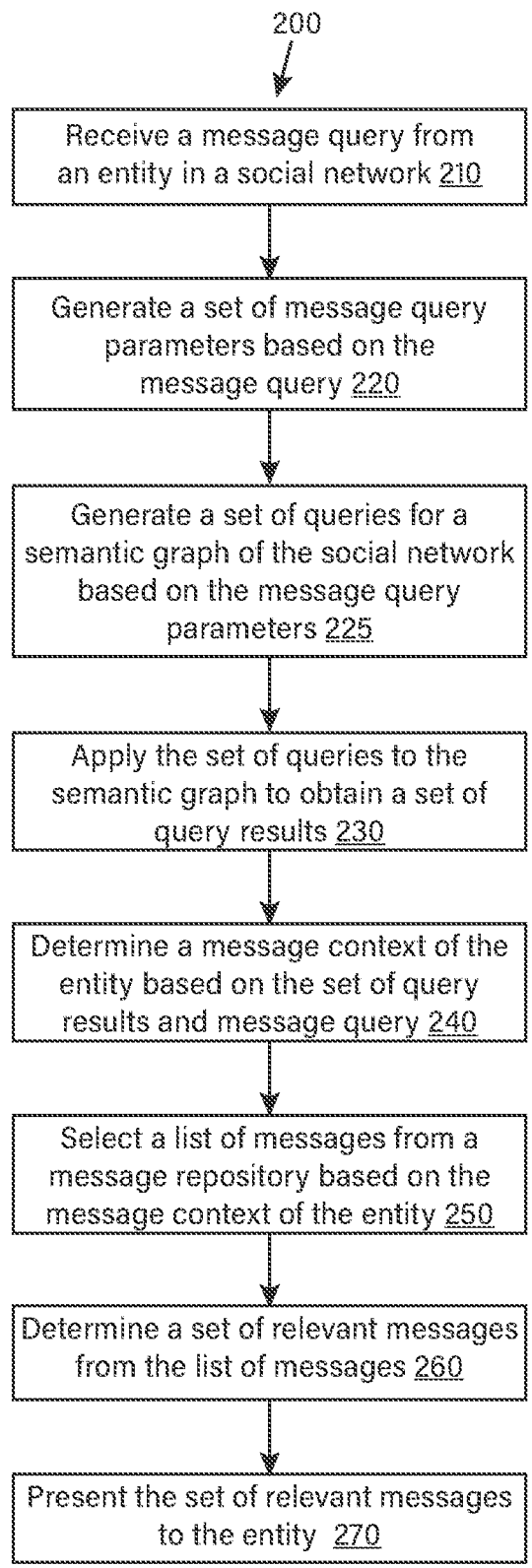
FIG. 2 is a flowchart of an example method implementing message query service.

FIG. 2 is a flowchart of an example method 200 of message query service and can be performed, for example, by the system 100 illustrated in FIG. 1. Operations are illustrated once and each and in a particular order in FIG. 2, but the operations may be reordered and/or repeated as desired and appropriate (for example, different operations illustrated as performed sequentially may be performed in parallel as suitable).

At 210, the method includes receiving a message query from an entity participating in a social network (e.g., a social network of machines). The message query can be generated by the entity or in response to an action by the entity at a client computer in the social network. The message query can be generated, for example, by a search service, a recommender service, a predictive maintenance, or a user query (the user can be a human or a machine). In one example, the message query is a text query. In some examples, the method 200 can receive the message query and the identifier of the entity. For illustration purposes, an example message query M1 can be "I am a machine of type D having issues with respect to a motor. I am looking for repair/replacement of motor M. I am based out of Bangalore and I need a fix immediately." In this example, the machine of type D is the entity that generated the message query M1. Another entity that is involved in the message query M1 is the motor M that needs repair or replacement.

At 220, the method includes generating a set of message query parameters from the message query. In some examples, the method can include generating tokens from the message query (e.g., using a semantic segmentation network) based on semantic criteria. Tokens can be composed of words, sentences, or topics. The method can include extracting features from the tokens and generating the message query parameters based on the extracted features. In one example, the method can include extracting entities from the tokens. The method can include querying a semantic layer for a semantic subgraph associated with the extracted entities. The method can include determining relationships from the semantic subgraph. The method can include extracting requirement features from the semantic segments and determining the requirements parameter from the requirement features. The method can include extracting constraints (e.g., time, location, and resources) from the semantic segments and generating a constraints parameter from the extracted constraints. In some examples, the set of message query parameters can include the entities parameter, requirements parameter, relationships parameter, and constraints parameter. For illustration purposes, for the example message query M1, the following message query parameters can be generated: {Entities: Machine type D, Motor M} and, {Requirements: Troubleshooting}, {Relationships: Motor M of Machine D}, and {Constraints: Location: B angalore, Time: Immediately}.

At 225, the method includes generating a set of queries for a semantic graph of the social network based on the message query parameters. The semantic graph represents relationships between entities in the social network, how the entities are related to each other, and what the entities communicate to each other. The queries can be designed to obtain information that would be useful in determining whether a potential entity can fulfill the requirements specified in a requirements parameter under the constraints specified in a constraints parameter. For illustration purposes, for the example message query M1 and the corresponding example message query parameters, the following example queries can be generated for the semantic graph: all the repair agents within Bangalore; all the repair agents who can attend immediately; repair agents of other machines of type D; and past history repairs of motor D.

At 230, the method includes applying the set of queries to the semantic graph to obtain a set of query results. The semantic graph represents relationships between entities in the social network, how the entities are related to each other, and what the entities communicate to each other. A query result can be a semantic subgraph extracted from the semantic graph based on the parameters of a query. The set of query results can be a semantic subgraph or a set of semantic subgraphs. In some examples, the method can include calling a search API and/or a recommender API associated with the semantic graph to apply the set of queries to the semantic graph.

At 240, the method includes determining a message context of the entity based on the set of query results obtained in operation 230 and the message query parameters generated based on the message query in operation 220. In some examples, the message context can include a list of potential entities and metadata from the set of query results and a set of constraints from the message query parameters. The potential entities are entities that can potentially satisfy the requirements in the message query (e.g., for the message query M1, these can include repair agents within Bangalore, repair agents that can attend to the repair immediately, and repair agents of other machines of type D). In some examples, the message context can include a set of semantic subgraphs received as query results in operation 230 and a set of constraints from the message query parameters. The set of semantic subgraphs can include the potential entities and other metadata stored in association with the potential entities.

At 250, the method includes selecting a list of messages from a message repository based on the message context of the entity. In one example, the method can include querying a message repository for the list of messages using at least a portion of the data in the message context as the search criteria (e.g., the list of potential entities). For example, the method can include searching for messages created by the potential entities in the message context.

At 260, the method includes determining a set of relevant messages from the list of messages. For example, the method can include determining relevance scores for the list of messages based on the message context of the entity determined in operation 240. In some examples, the relevance score for a given message m can be determined using a machine learning model. In one example, the given message m and the message context of the entity can be applied to the machine learning model to produce a relevance score for the given message. The machine learning model can be used to produce the relevance scores for the messages on the list of messages. In some examples, the method can include selecting the messages in the list of messages with relevance scores greater than a threshold as candidate messages. The method can include ranking the candidate messages based on their relevance scores (e.g., the candidate messages with higher relevance scores are ranked higher than the candidate message with lower relevance scores). The method can include evaluating the feasibility of the candidate messages. For example, the method can include determining the availability, bandwidth, compliance, and actual cost of the candidate message. For example, the method can include determining the entities in the candidate messages, requesting semantic subgraphs that capture the entities and their corresponding relationships from a semantic layer, and using the information in the semantic subgraphs to evaluate the candidate messages (see Example III). In some cases, the message context can include the semantic subgraphs that can be used in evaluating the candidate messages. The top k feasible candidate messages can be selected as the set of relevant messages (where k is a number such as 1 or greater).

In one example, the method can include adjusting the relevance scores of the messages in the list of messages based on performance statistics of the messages. In some examples, the relevance scores can be adjusted prior to selecting the candidate messages from the list of messages. In other examples, the relevance scores of the candidate messages can be adjusted prior to ranking the candidate messages and evaluating the feasibility of the candidate messages. In some examples, the method can include receiving the performance statistics from an analytics module. The performance statistics for a message can be time-series data generated from monitoring a set of metrics on the message and analyzing the metrics data.

In some cases, when the method receives the performance statistics of a message, the method can also receive entity feedback for the message. In some examples, the method can include adjusting the relevance score of the message based on the entity feedback. The relevance score can be adjusted prior to selecting the candidate messages from the list of messages or prior to ranking the candidate messages using relevance scores, which would allow the entity feedback to be incorporated into the selection of the relevant messages from the candidate messages.

At 270, the method can include presenting the set of relevant messages to the entity. The set of relevant messages can be presented, for example, on a console that is accessible from the client computer associated with the entity. The presentation of the set of relevant messages to the entity can, in some examples, include displaying or rendering the set of relevant messages in a user interface on the client computer of the entity. The ad messages in the set of relevant messages can be displayed or rendered in a mode indicated in the messages (for example, video, text, or image).

The method can include receiving feedback from the entity on the presented/displayed set of relevant messages. The method can include analyzing the entity feedback and integrating the analysis into the performance statistics of the messages. The method can include storing the performance statistics in the stored copies of the messages (e.g., copies of the messages in the message repository or in an ad engine).

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example V—System Implementing Message Generation Service

Figure 3:
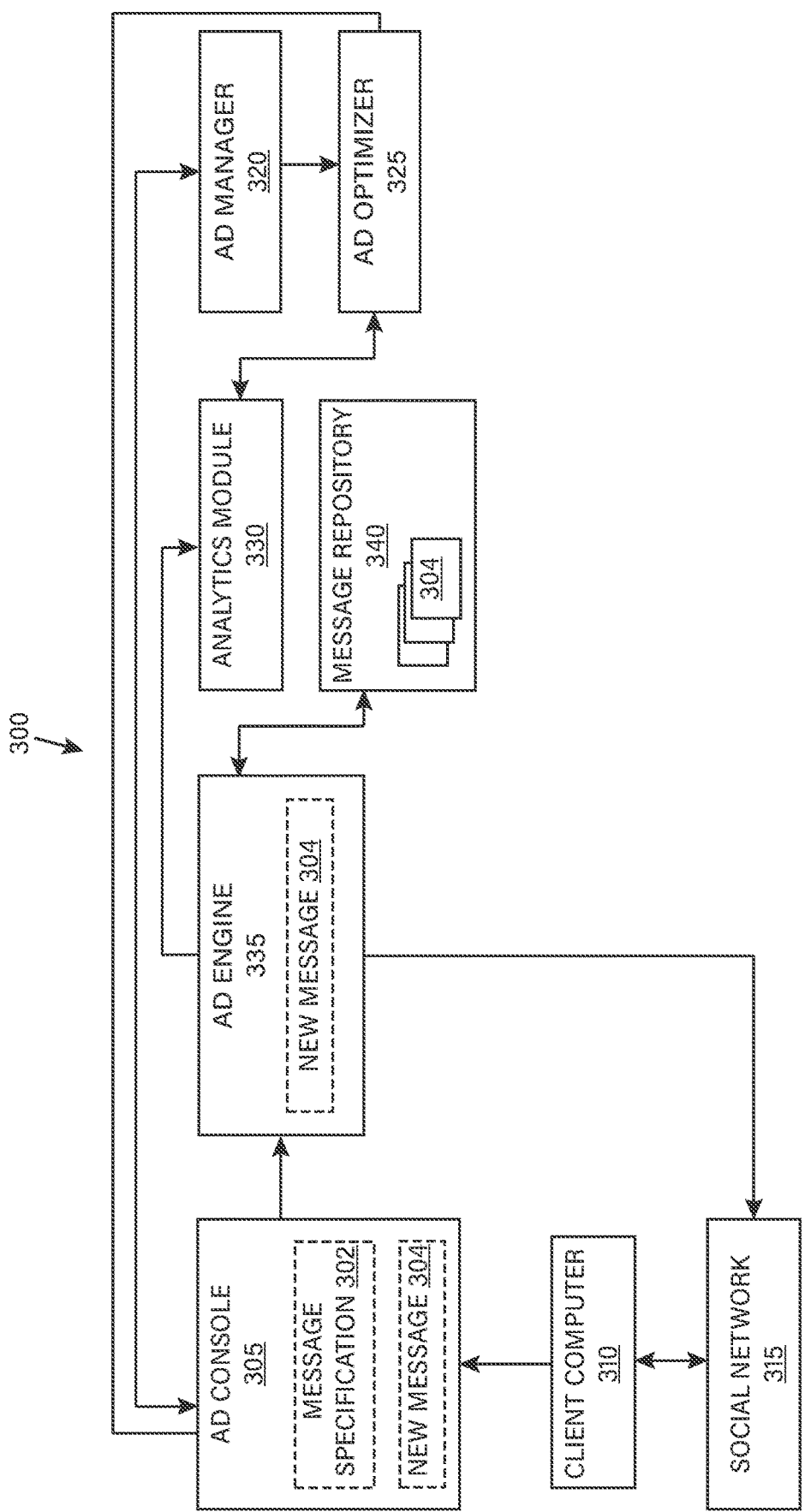
FIG. 3 is a block diagram of an example system implementing message generation service.

FIG. 3 is a block diagram of an example system 300 implementing message generation service. The system 300 can be used to generate messages that can be stored in a message repository and rendered within a network.

The system 300 can include an ad console 305 that can be accessed from a client computer 310 connected to a social network 315 (e.g., a social network of machines) with appropriate access control. The ad console 305 can accept a message specification 302 from an entity at the client computer 310. In one example, the message specification 302 can include information to use in creating a message, such as a message template, mode of display (e.g., video, text, or image), content (e.g., description, header, alternate text), search content (e.g., dictionary of key value pairs, specifications). The ad console 305 can generate a new message 304 based on the message specification 302, for example, in response to the entity selecting a "draft message" command on the ad console 305.

The system 300 includes an ad manager 320 that can assist in setting ad parameters for the new message 304. Examples of ad parameters that can be set can include budget, goal (e.g., creating awareness, getting more traction, or increasing user traffic), target metrics (e.g., impressions), and expiry date. In one example, after the ad console 305 creates the new message 304, the ad console 305 can register the new message 304 with the ad manager 320. The ad manager 320 can pass a handle for setting the ad parameters of the new message 304 to the ad console 305. The ad console 305 can expose the handle to the entity and allow the entity to set the initial values for the ad parameters. The values for the ad parameters can be stored in the new message 304 and on the ad manager 320 (e.g., using the identifier of the new message).

The system 300 can include an ad optimizer 325 that can recommend changes to the new message 304 based on historical performance of existing messages. The system 300 can include an analytics module 330 that can monitor a set of metrics for messages and analyze the measurements to produce performance statistics for the messages. In one example, the ad manager 320 can send a request to the ad optimizer 325 to recommend changes to the new message 304. The ad optimizer 325 can query the analytics module 330 for the metadata and performance data of existing messages that are similar to the new message 304. Similarity of messages can be determined by using lexical and semantic similarity (e.g., using BERT embeddings and cosine similarity or message embedding with Word2Vec and KL divergence as distance measure). The ad optimizer 325 can compare the parameters of the existing similar messages to the parameters of the new message 304 and recommend changes to the parameters of the new message 304. For example, the ad optimizer 325 can recommend changes to the target metric, keywords, or other parameters of the new message.

The ad optimizer 325 can transmit the recommended changes to the ad console 305. In one example, the ad console 305 can present the recommended changes to the entity and allow the entity to select which recommended changes to apply to the new message 304. The ad console 305 can receive the selected recommend changes and apply the selected recommended changes to the new message 304.

The system 300 includes an ad engine 335 that can receive the final version of the new message 304 and store the final version of the new message in a message repository 340. The ad engine 335 can render the new message within the network. The ad manager 320 can monitor the performance of the new message 304 and capture feedback on the new message using the analytics module 330. In some examples, the ad manager 320 can optimize the ad parameters of the new message 304 based on recommendations from the ad optimizer 325 during a timeline in which the new message 304 is rendered within the network.

Example VI—Method of Message Generation Service

Figure 4:
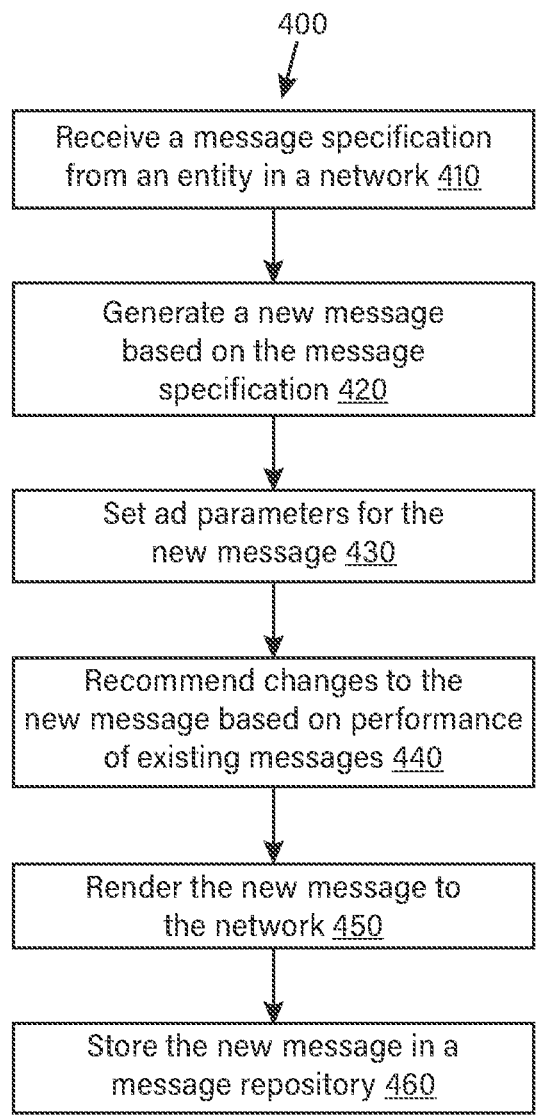
FIG. 4 is a flowchart of an example method implementing message generation service.

FIG. 4 is a flowchart of an example method 400 of message generation service and can be performed using the system 300 illustrated in FIG. 3. Operations are illustrated once and each and in a particular order in FIG. 4, but the operations may be reordered and/or repeated as desired and appropriate (for example, different operations illustrated as performed sequentially may be performed in parallel as suitable).

At 410, the method includes receiving a message specification from an entity within a network (e.g., a social network of machines). The message specification includes information to use in creating a message. For example, the message specification can include a message template, mode of display, content, keywords, and search context. In one example, the message specification can be received at an ad console that allows users to create, view, and edit messages.

At 420, the method includes generating a new message based on the message specification. For example, the ad console can generate the new message based on the message specification. The message can be generated by creating a container with message attributes and populating the attributes with the data provided in the message specification.

At 430, the method includes setting ad parameters for the new message. The ad parameters can include, for example, budget, goal, target metrics, and expiration date. In one example, the new message can be registered with an ad manager. The ad manager can provide a handle to the ad parameters for the new message. Using the handle, the entity can specify initial values for the ad parameters.

At 440, the method includes recommending changes to the new message based on the performance of existing messages. In one example, the method can include searching for existing messages that are similar to the new message. The method can include analyzing the performance history of the similar messages and selecting optimum parameter values based on the analysis. The method can include comparing the parameter values of the new message to the optimum parameter values and recommending changes to the parameter values of the new message. For example, changes can be recommended to keywords, target metrics, or other parameters of the new message based on the performance history of the existing messages.

At 450, the method can include rendering the new message to the network. In some cases, prior to rendering the new message, the method can include applying a selection of the changes recommended in operation 440 to the new message. For example, the changes recommended in operation 440 can be presented to the entity on the ad console. The entity can be allowed to select which of the recommended changes to apply. If the entity selects recommended changes to apply, the changes can be applied to the new message prior to rendering the new message to the network.

At 460, the method includes storing the new message in a message repository. The method can include registering the new message with an analytics module so that the performance of the new message can be measured and analyzed. The data collected by the analytics module can be used for subsequent additional optimization of the new message.

Example VII—System Implementing Message Query Service and Message Generation Service The system 300 illustrated in FIG. 3 can be integrated with the system 100 illustrated in FIG. 1. For example, the functionality of the ad engine 335 can be integrated into the ad engine 105; the functionality of the ad console 305 can be integrated into the ad console 180; the functionality of the analytics module 330 can be integrated into the analytics module 165; the functionality of the message repository 340 can be integrated into the message repository 115. The integrated system can have a message query service mode and a message generation service mode, which can run concurrently or separately.

Example VIII—Example Social Network of Machines

Figure 7:
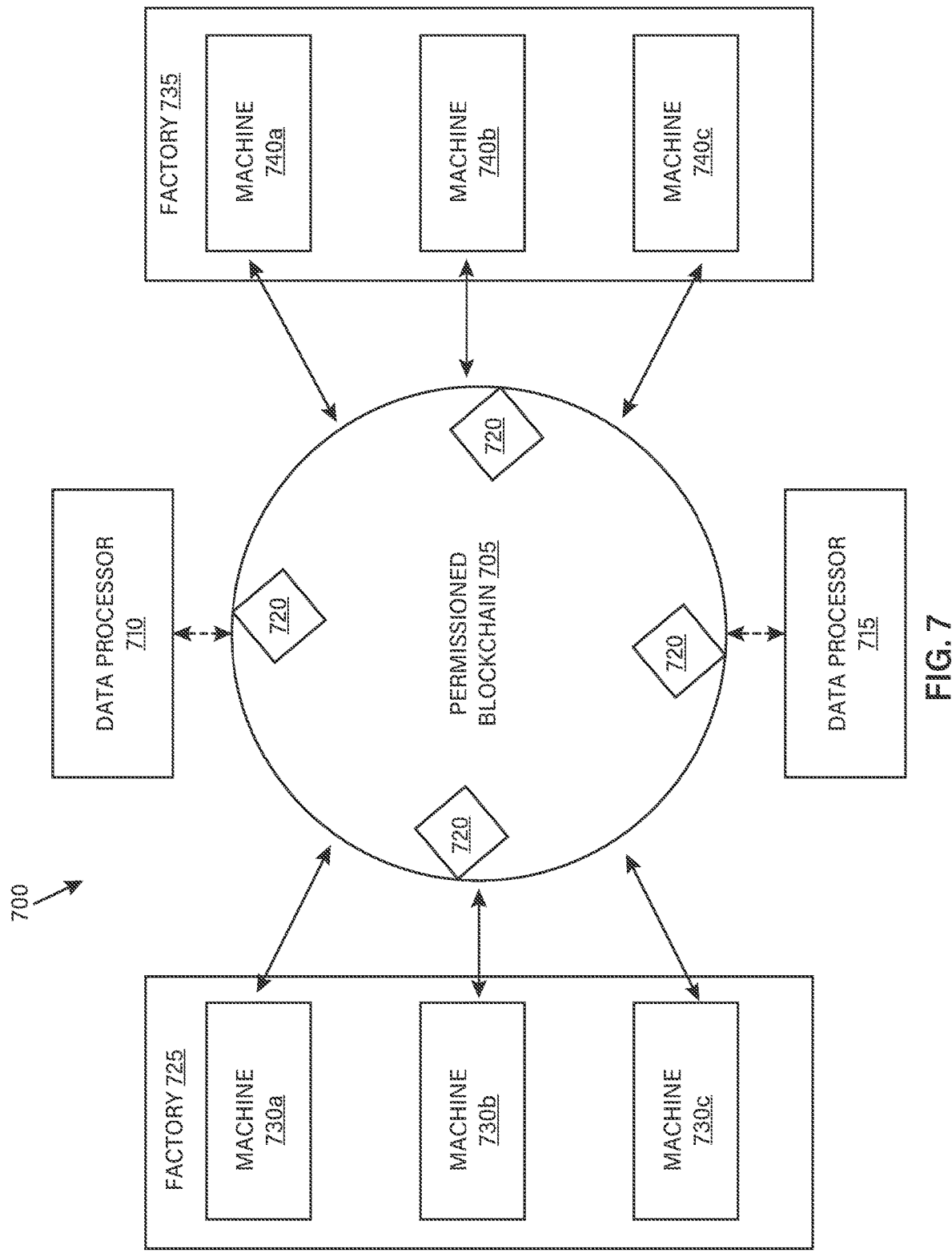
FIG. 7 is a block diagram of an example social network of machines.

FIG. 7 shows an example social network of machines 700 that can use the systems illustrated in FIGS. 1 and 3 and the associated methods. In the illustrated example, the social network of machines 700 includes a permissioned blockchain 705 using one or more nodes 720 to manage the blockchain. For example, each node 720 can maintain a copy of the blockchain ledger. The permission blockchain 705 can run on data processors 710, 715. In the illustrated example, the social network of machines 700 includes a first factory 725 with machines 730a-c that can communicate with the permissioned blockchain 705. In the illustrated example, the social network of machines 700 includes a second factory 735 with machines 740a-c that can communicate with the permissioned blockchain 705. Other entities (see Example IIB) can communicate with the machines via the permissioned blockchain 705.

Example IX—Computing Systems

Figure 5:
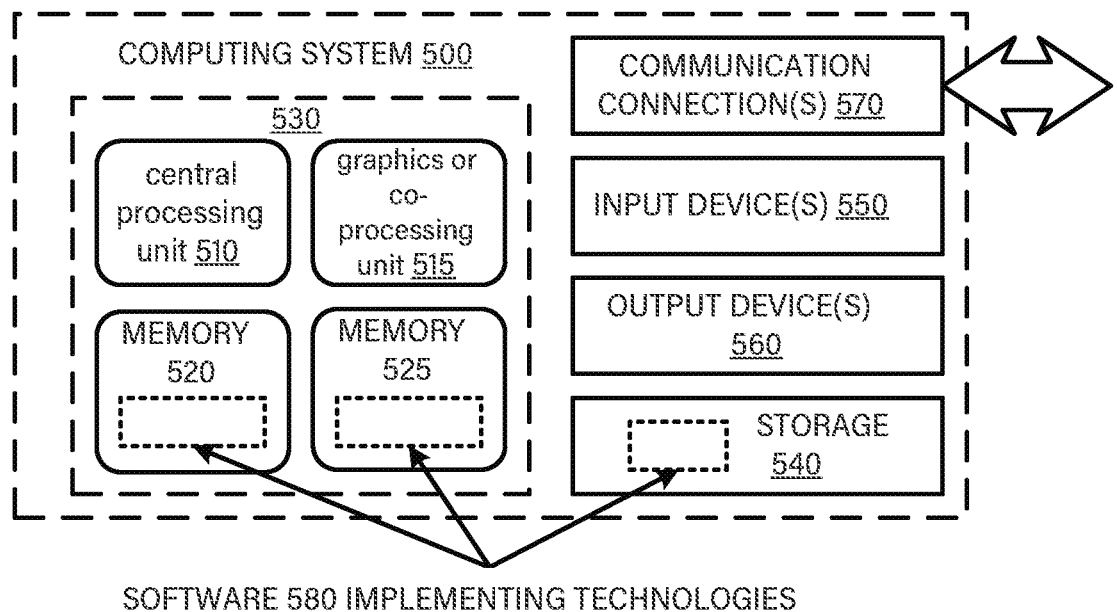
FIG. 5 is a block diagram of an example computing system in which described technologies can be implemented.

FIG. 5 depicts an example of a suitable computing system 500 in which the described innovations can be implemented. The computing system 500 is not intended to suggest any limitation as to scope of use or functionality of the present disclosure, as the innovations can be implemented in diverse computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions, such as for implementing the features described in the examples herein. A processing unit can be a general-purpose central processing unit (CPU), processor in an application-specific integrated circuit (ASIC), graphics processing unit (GPU), tensor processing unit (TPU), quantum processor, or any other type of processor. In a multi-processing system, multiple processing units execute computer-executable instructions to increase processing power. For example, FIG. 5 shows a central processing unit 510 as well as a graphics processing unit or co-processing unit 515. The tangible memory 520, 525 can be volatile memory (e.g., registers, cache, RAM), non-volatile memory (e.g., ROM, EEPROM, flash memory, etc.), or some combination of the two, accessible by the processing unit(s) 510, 515. The memory 520, 525 stores software 580 implementing one or more innovations described herein, in the form of computer-executable instructions suitable for execution by the processing unit(s) 510, 515.

A computing system 500 can have additional features. For example, the computing system 500 includes storage 540, one or more input devices 550, one or more output devices 560, and one or more communication connections 570, including input devices, output devices, and communication connections for interacting with a user. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 can be removable or non-removable, and includes magnetic disks, magnetic tapes or cassettes, CD-ROMs, DVDs, or any other medium which can be used to store information in a non-transitory way and which can be accessed within the computing system 500. The storage 540 stores instructions for the software 580 implementing one or more innovations described herein.

The input device(s) 550 can be an input device such as a keyboard, mouse, pen, or trackball, a voice input device, a scanning device, touch device (e.g., touchpad, display, or the like) or another device that provides input to the computing system 500. The output device(s) 560 can be a display, printer, speaker, CD-writer, or another device that provides output from the computing system 500, e.g., actuators or some mechanical devices like motors, 3D printers, and the like.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example X—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example XI—Cloud Computing Environment

Figure 6:
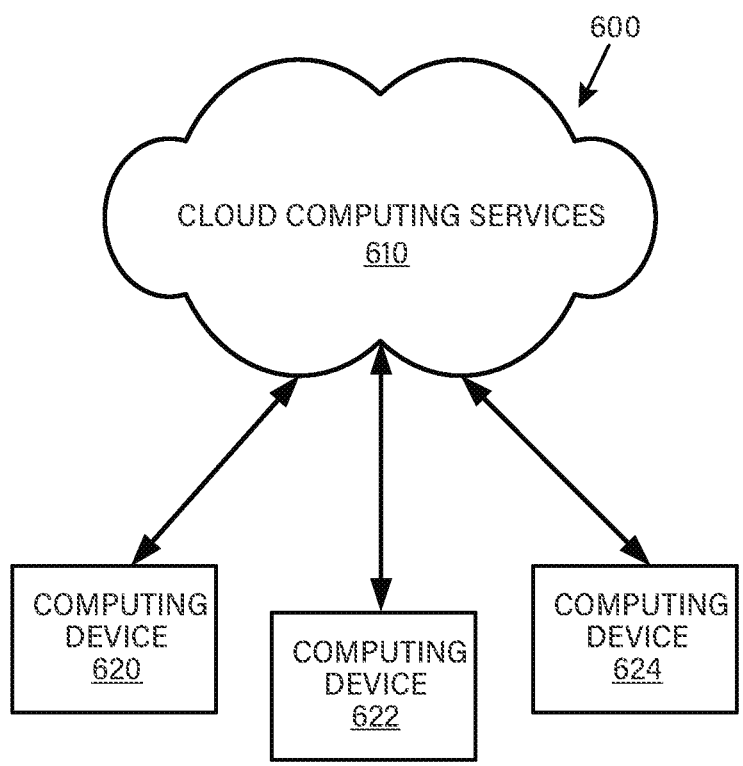
FIG. 6 is a block diagram of an example cloud computing environment that can be used in conjunction with the technologies described herein.

FIG. 6 depicts an example cloud computing environment 600 in which the described technologies can be implemented, including, e.g., the systems described herein. The cloud computing environment 600 comprises cloud computing services 610. The cloud computing services 610 can comprise various types of cloud computing resources, such as computer servers, data storage repositories, networking resources, etc. The cloud computing services 610 can be centrally located (e.g., provided by a data center of a business or organization) or distributed (e.g., provided by various computing resources located at different locations, such as different data centers and/or located in different cities or countries).

The cloud computing services 610 are utilized by various types of computing devices (e.g., client computing devices), such as computing devices 620, 622, and 624. For example, the computing devices (e.g., 620, 622, and 624) can be computers (e.g., desktop or laptop computers), mobile devices (e.g., tablet computers or smart phones), or other types of computing devices. For example, the computing devices (e.g., 620, 622, and 624) can utilize the cloud computing services 610 to perform computing operations (e.g., data processing, data storage, and the like).

In practice, cloud-based, on-premises-based, or hybrid scenarios can be supported.

Additional Examples

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: A computer-implemented method comprises receiving a message query from an entity identifier participating in a social network, wherein the message query specifies one or more entities, one or more requirements, and one or more constraints; generating a set of message query parameters based on the message query; generating a set of queries for a semantic graph of the social network based on the set of message query parameters; applying the set of queries to the semantic graph to obtain a set of query results; determining a message context of the entity identifier based on the set of query results and the set of message query parameters; and determining a set of messages from a message repository based on the message context of the entity identifier, wherein the set of messages is presented on a client computer associated with the entity identifier.

Example 2: The method according to Example 1, wherein receiving the message query from the entity identifier participating in the social network comprises receiving the message query from an entity in the social network having a machine profile.

Example 3: The method according to Example 1 or Example 2, wherein generating the set of message query parameters based on the message query comprises generating a plurality of tokens from the message query; extracting the one or more entities from the plurality of tokens; and building a semantic subgraph from the semantic graph based on the one or more entities.

Example 4: The method according to Example 3, wherein generating the set of message query parameters comprises generating an entities parameter based on the one or more entities; and generating a relationships parameter based on the semantic subgraph.

Example 5: The method according to Example 4, wherein generating the set of message query parameters comprises extracting the one or more constraints from the plurality of tokens; generating a constraints parameter based on the one or more constraints; extracting the one or more requirements from the plurality of tokens; and generating a requirements parameter based on the one or more requirements.

Example 6: The method according to Example 5, wherein the set of query results obtained comprises a set of entities determined from the semantic graph based on the requirements parameter and the constraints parameter.

Example 7: The method according to Example 6, wherein the set of query results obtained comprises a set of semantic subgraphs associated with the set of entities.

Example 8: The method according to Example 1, wherein the message context comprises a set of entities from the set of query results, and wherein determining the set of messages from the message repository based on the message context of the entity identifier comprises selecting a first set of messages from the message repository based on the set of entities in the message context.

Example 9: The method according to Example 8, wherein determining the set of messages from the message repository based on the message context of the entity comprises determining relevance scores for the first set of messages for the message context; and determining a second set of messages having relevance scores exceeding a threshold from the first set of messages.

Example 10: The method of Example 9, wherein determining one or more relevance scores for the first set of messages for the message context comprises applying a given message from the first set of messages and the message context of the entity to a machine learning model to produce a relevance score for the given message.

Example 11: The method of Example 10, further comprising adjusting the relevance score for the given message based on measurements of one or more performance parameters of the given message.

Example 12: The method according to Example 10 further comprises adjusting the relevance score for the given message based on an entity feedback on the given message.

Example 13: The method according to Example 9 further comprises determining feasibility of the second set of messages based on the semantic graph, and selecting the set of messages from the second set of messages based on the feasibility of the second set of messages.

Example 14: The method according to any one of Examples 1-13 further comprises rendering the set of messages in a user interface at the client computer and receiving an entity feedback on a selected message of the set of messages.

Example 15: The method according to Example 14 further comprises storing the entity feedback in association with the selected message.

Example 16: The method according to any one of Examples 1-15 further comprises generating a new message and storing the new message in the message repository.

Example 17: The method according to Example 16 further comprises determining a set of recommended changes to one or more parameters of the new message based on a historical performance of one or more existing messages in the message repository with a similarity to the new message.

Example 18: The method according to Example 17 further comprises applying at least one recommended change to the new message prior to storing the new message in the message repository.

Example 19: One or more non-transitory computer-readable storage media storing computer-executable instructions for causing a computer system to perform operations comprises receiving a message query from a machine identifier participating in a social network; applying the message query to a semantic segmentation network to produce a set of message query parameters; generating a set of queries for a semantic graph of the social network based on the set of message query parameters; applying the set of queries to the semantic graph to obtain a set of query results; determining a message context of the machine identifier based on the set of query results and the set of message query parameters; and determining a set of messages from a message repository based on the message context of the machine identifier, wherein the set of messages is presented on a machine associated with the machine identifier.

Example 20: A computing system comprises a social network comprising a plurality of machines participating as entities; one or more processing units coupled to memory; and one or more computer-readable storage media storing instructions that when executed by the computing system cause the computing system to perform operations comprising: receiving a message query from an entity identifier participating in the social network; applying the message query to a semantic segmentation network to produce a set of message query parameters; generating a set of queries for a semantic graph of the social network based on the set of message query parameters; applying the set of queries to the semantic graph to obtain a set of query results; determining a message context of the entity identifier based on the set of query results and the set of message query parameters; and determining a set of messages from a message repository based on the message context of the entity identifier, wherein the set of messages is presented on a client computer associated with the entity identifier.

Example Implementation

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example Alternatives

The technology has been described with a selection of implementations and examples, but these preferred implementations and examples are not to be taken as limiting the scope of the technology since many other implementations and examples are possible that fall within the scope of the disclosed technology. The scope of the disclosed technology includes what is covered by the scope and spirit of the following claim.

The invention claimed is:

1. A computer-implemented method comprising:
receiving a message query from an entity identifier participating in a social network, wherein the message query specifies one or more entities, one or more requirements, and one or more constraints;
generating a set of message query parameters based on the message query;
generating a set of queries for a semantic graph of the social network based on the set of message query parameters;
applying the set of queries to the semantic graph to obtain a set of query results;
determining a message context of the entity identifier based on the set of query results and the set of message query parameters; and
determining a set of messages from a message repository based on the message context of the entity identifier, wherein the set of messages is presented on a client computer associated with the entity identifier;
wherein generating the set of message query parameters based on the message query comprises:
generating a plurality of tokens from the message query;
extracting the one or more entities from the plurality of tokens;
building a semantic subgraph from the semantic graph based on the one or more entities;
extracting the one or more constraints from the plurality of tokens;
generating a constraints parameter based on the one or more constraints;
extracting the one or more requirements from the plurality of tokens; and
generating a requirements parameter based on the one or more requirements;
wherein the set of query results obtained comprises a set of entities determined from the semantic graph based on the requirements parameter and the constraints parameter.

2. The method of claim 1, wherein receiving the message query from the entity identifier participating in the social network comprises receiving the message query from an entity in the social network having a machine profile.

3. The method of claim 1, wherein generating the set of message query parameters comprises:
generating an entities parameter based on the one or more entities; and
generating a relationships parameter based on the semantic subgraph.

4. The method of claim 1, wherein the set of query results obtained comprises a set of semantic subgraphs associated with the set of entities.

5. The method of claim 1, wherein the message context comprises a set of entities from the set of query results, and wherein determining the set of messages from the message repository based on the message context of the entity identifier comprises selecting a first set of messages from the message repository based on the set of entities in the message context.

6. The method of claim 5, wherein determining the set of messages from the message repository based on the message context of the entity comprises:
determining relevance scores for the first set of messages for the message context; and
determining a second set of messages having relevance scores exceeding a threshold from the first set of messages.

7. The method of claim 6, wherein determining one or more relevance scores for the first set of messages for the message context comprises applying a given message from the first set of messages and the message context of the entity to a machine learning model to produce a relevance score for the given message.

8. The method of claim 7, further comprising adjusting the relevance score for the given message based on measurements of one or more performance parameters of the given message.

9. The method of claim 7, further comprising adjusting the relevance score for the given message based on an entity feedback on the given message.

10. The method of claim 6, further comprising:
determining feasibility of the second set of messages based on the semantic graph; and
selecting the set of messages from the second set of messages based on the feasibility of the second set of messages.

11. The method of claim 1, further comprising rendering the set of messages in a user interface at the client computer and receiving an entity feedback on a selected message of the set of messages.

12. The method of claim 11, further comprising storing the entity feedback in association with the selected message.

13. The method of claim 1, further comprising generating a new message and storing the new message in the message repository.

14. The method of claim 13, further comprising determining a set of recommended changes to one or more parameters of the new message based on a historical performance of one or more existing messages in the message repository with a similarity to the new message.

15. The method of claim 14, further comprising applying at least one recommended change to the new message prior to storing the new message in the message repository.

16. One or more non-transitory computer-readable storage media storing computer-executable instructions for causing a computer system to perform operations comprising:
receiving a message query from a machine identifier participating in a social network;
applying the message query to a semantic segmentation network to produce a set of message query parameters;
generating a set of queries for a semantic graph of the social network based on the set of message query parameters;
applying the set of queries to the semantic graph to obtain a set of query results;
determining a message context of the machine identifier based on the set of query results and the set of message query parameters;
determining a set of messages from a message repository based on the message context of the machine identifier, wherein the set of messages is presented on a machine associated with the machine identifier; and
wherein the message context comprises a set of entities from the set of query results, and wherein determining the set of messages from the message repository based on the message context of the entity comprises:

selecting a first set of messages from the message repository based on the set of entities in the message context;

determining relevance scores for the first set of messages for the message context; and determining a second set of messages having relevance scores exceeding a threshold from the first set of messages.

17. The one or more non-transitory computer-readable storage media of claim 16 wherein:

determining one or more relevance scores for the first set of messages for the message context comprises applying a given message from the first set of messages and the message context of the entity to a machine learning model to produce a relevance score for the given message.

18. The one or more non-transitory computer-readable storage media of claim 17 wherein the operations further comprise:

adjusting the relevance score for the given message based on measurements of one or more performance parameters of the given message.

19. The one or more non-transitory computer-readable storage media of claim 17 wherein the operations further comprise:

adjusting the relevance score for the given message based on an entity feedback on the given message.

20. A computing system comprising:

a social network comprising a plurality of machines participating as entities;

one or more processing units coupled to memory; and one or more computer-readable storage media storing instructions that when executed by the computing system cause the computing system to perform operations comprising:

receiving a message query from an entity identifier participating in the social network, wherein the message query specifies one or more entities, one or more requirements, and one or more constraints;

applying the message query to a semantic segmentation network to produce a set of message query parameters;

generating a set of queries for a semantic graph of the social network based on the set of message query parameters;

applying the set of queries to the semantic graph to obtain a set of query results;

determining a message context of the entity identifier based on the set of query results and the set of message query parameters; and determining a set of messages from a message repository based on the message context of the entity identifier, wherein the set of messages is presented on a client computer associated with the entity identifier;

wherein generating the set of message query parameters based on the message query comprises:

generating a plurality of tokens from the message query;

extracting the one or more entities from the plurality of tokens;

building a semantic subgraph from the semantic graph based on the one or more entities;

extracting the one or more constraints from the plurality of tokens;

generating a constraints parameter based on the one or more constraints;

extracting the one or more requirements from the plurality of tokens; and generating a requirements parameter based on the one or more requirements;

wherein the set of query results obtained comprises a set of entities determined from the semantic graph based on the requirements parameter and the constraints parameter; and wherein the message context comprises a set of entities from the set of query results, and wherein determining the set of messages from the message repository based on the message context of the entity comprises:

selecting a first set of messages from the message repository based on the set of entities in the message context;

determining relevance scores for the first set of messages for the message context; and determining a second set of messages having relevance scores exceeding a threshold from the first set of messages.

* * * * *